United States Patent [19]

Chuang

[11] Patent Number: 5,405,038

[45] Date of Patent: Apr. 11, 1995

[54] VACUUM FOOD CONTAINER DEVICE

[76] Inventor: Hsiao-Cheng Chuang, No. 143, Chung I Road, Taoyuan, Taiwan, Prov. of China

[21] Appl. No.: 160,680

[22] Filed: Dec. 2, 1993

[51] Int. Cl.⁶ .......................................... B65D 51/16
[52] U.S. Cl. .................................... 220/231; 220/367; 215/228; 215/270; 215/311; 206/509; 141/65; 137/522; 137/854
[58] Field of Search ............... 220/212, 231, 367; 215/228, 270, 307, 309, 311; 206/509; 141/25, 26, 27, 28, 65; 137/522, 854

[56] References Cited

U.S. PATENT DOCUMENTS 4,579,147 4/1986 Davies et al. ..................... 137/854
4,989,745 2/1991 Schneider ......................... 220/208

*Primary Examiner*—Allan N. Shoap
*Assistant Examiner*—Nova Stucker
*Attorney, Agent, or Firm*—Bacon & Thomas

[57] ABSTRACT

This device has three main components: a storage container, an air-tight lid and a pump for extracting air. The storage container is distinguished by a ring-shaped protrusion in the concave bottom of the container. This protruding ring is designed to fit tightly into a concave ring on the lid of another container of the same design. This feature enables the containers to be stacked conveniently on top of one another. The storage container is further distinguished by an elevated lip on the upper rim of the container, which forms an air-tight seal with the lid. The lid is distinguished by a vacuum valve containing two layers with several holes in each layer. The vacuum valve contains an umbrella-shaped silicon piece, which can bend upwards to allow air to be drawn out by the pump, but is restricted from bending downwards (which would allow air to enter the container).

4 Claims, 5 Drawing Sheets

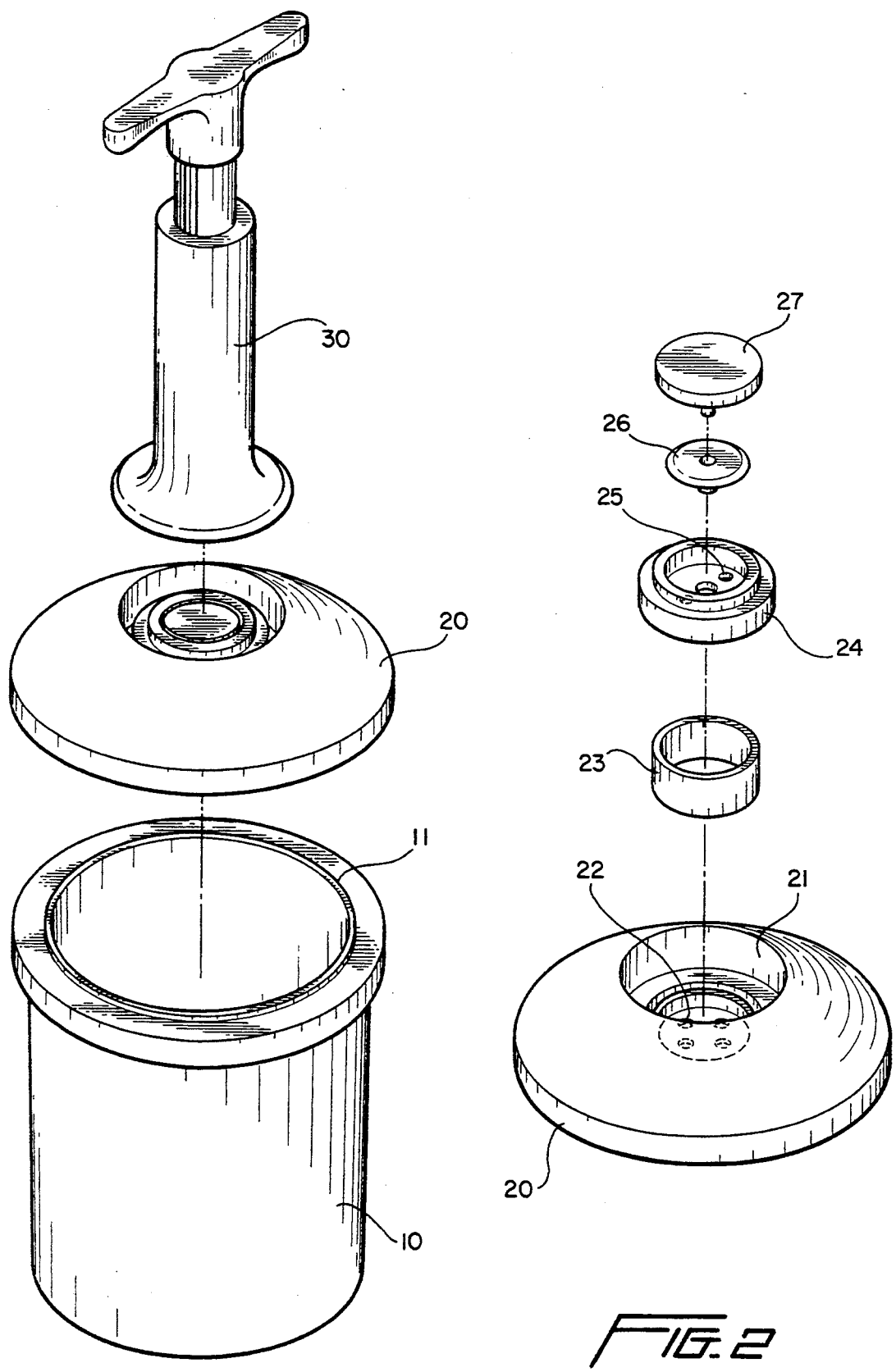

VACUUM FOOD CONTAINER DEVICE

BACKGROUND

This device is a vacuum storage container characterized by an air-tight vacuum chamber and an exterior design that makes for convenient storage.

It is an object of the present invention to enable the lid and container to fit together better.

It is another object of the present invention to enable the containers to be stacked on top of one another in stable, space saving columns.

It is yet another object of the present invention to provide an enhanced fit between lid and pump, and thereby reduce difficulties while operating the pump.

BRIEF DESCRIPTION OF THE DRAWINGS

FIG. 1: Exploded View of Major Components
FIG. 2: Exploded View of Lid

DETAILED DESCRIPTION

Figure 3:
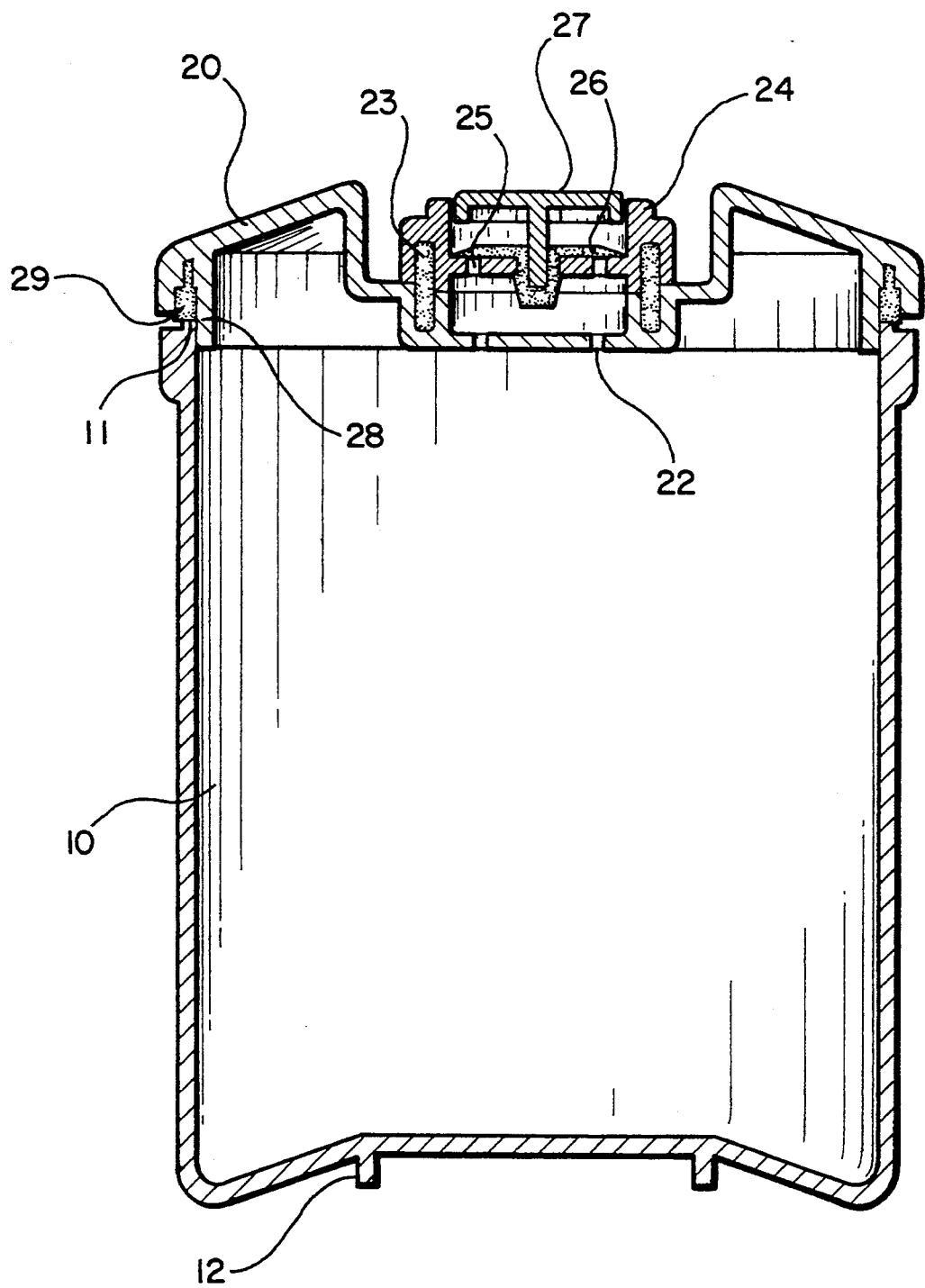
FIG. 3: Cross-Sectional View of Connection Between Lid and Storage Container

This device represents an improvement in the design of vacuum containers by providing greater convenience and utility with modifications to the lid, the air valve in the lid, the seal between the lid and container, and the connection between the pump and the lid, and by enabling the lid of one container to fit closely together with the base of another like container.

To further illustrate the unique characteristics of this device, a detailed explanation of the accompanying figures is here provided:

Please refer to FIG. 1, which is an exploded perspective view of the three major components of this device. At the bottom of the drawing is the storage container (10), above which is the lid (20) and the pump (30).

FIG. 2 is an exploded perspective view of the lid (20). In the center of the lid is a round cavity (21), at the bottom of which are several holes (20). Above this is a circular drum (24) with symmetrical holes in its base (25). Together these components form a narrow, twin-layered valve through which air may pass. Between these two components is a ring-shaped stopper (23).

Fitting into the circular drum (24) is an umbrella-shaped silicon piece (26), which plays a central role in the control of air flow in the pump, and on top of which fits a T-shaped button (27) which acts as cover for the opening in the lid, and can be used to release pressure from the container.

Refer to FIG. 3, which is a cross-sectional view of the connection between the lid and storage container. Note the ring-shaped protrusion in the concave bottom of the storage container (12), which facilitates stacking of the containers. Note also the elevated lip on the upper rim of the storage container (11), which fits perfectly together with the insulating wall (28) of the lid to form an air-tight seal.

Figure 4:
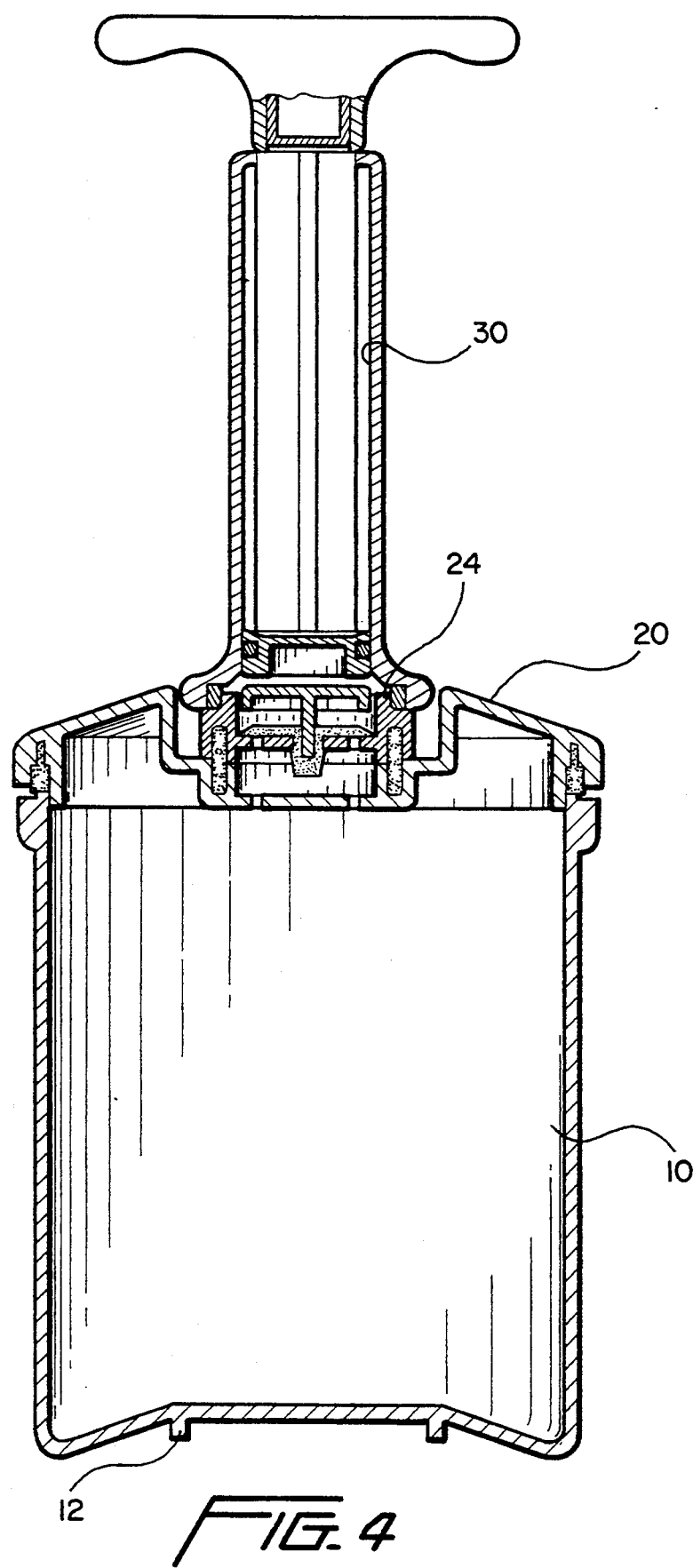
FIG. 4: Cross-Sectional View of Entire Device
Figure 5:
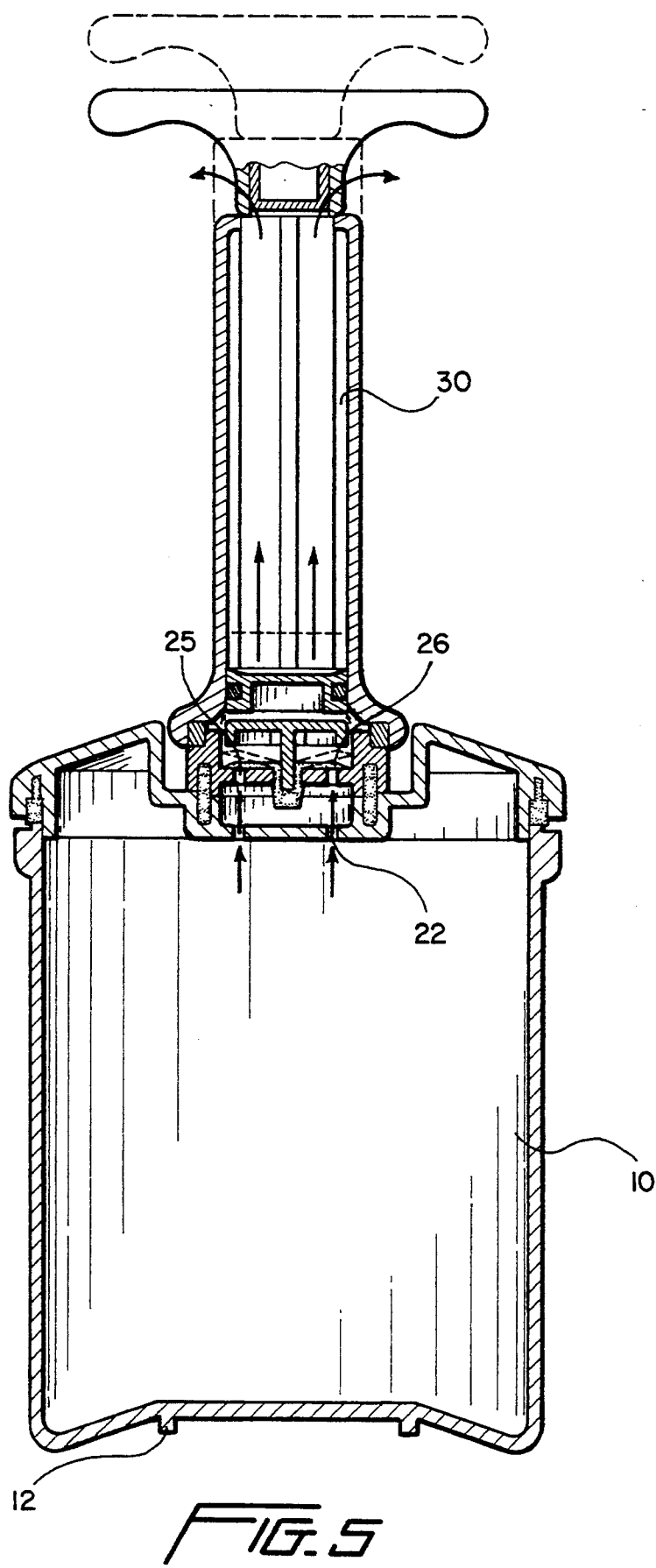
FIG. 5: Pump Device in Action

Refer now to FIG. 4, which is a cross-sectional view of the entire device, including pump, lid and storage container. This figure displays the secure fit between the pump shaft (30) and the circular drum (24) in the lid. Kindly refer to FIG. 5, which is a representation of the pump device in action. Low pressure is generated in the pump shaft. (30) when the pump handle is pulled upwards. This causes air in the storage container (10) to travel up through the twin-layered valve, bend the edges of the silicon piece upwards, and proceed through the resulting opening up into the pump shaft and out the holes in the top of the pump.

Figure 6:
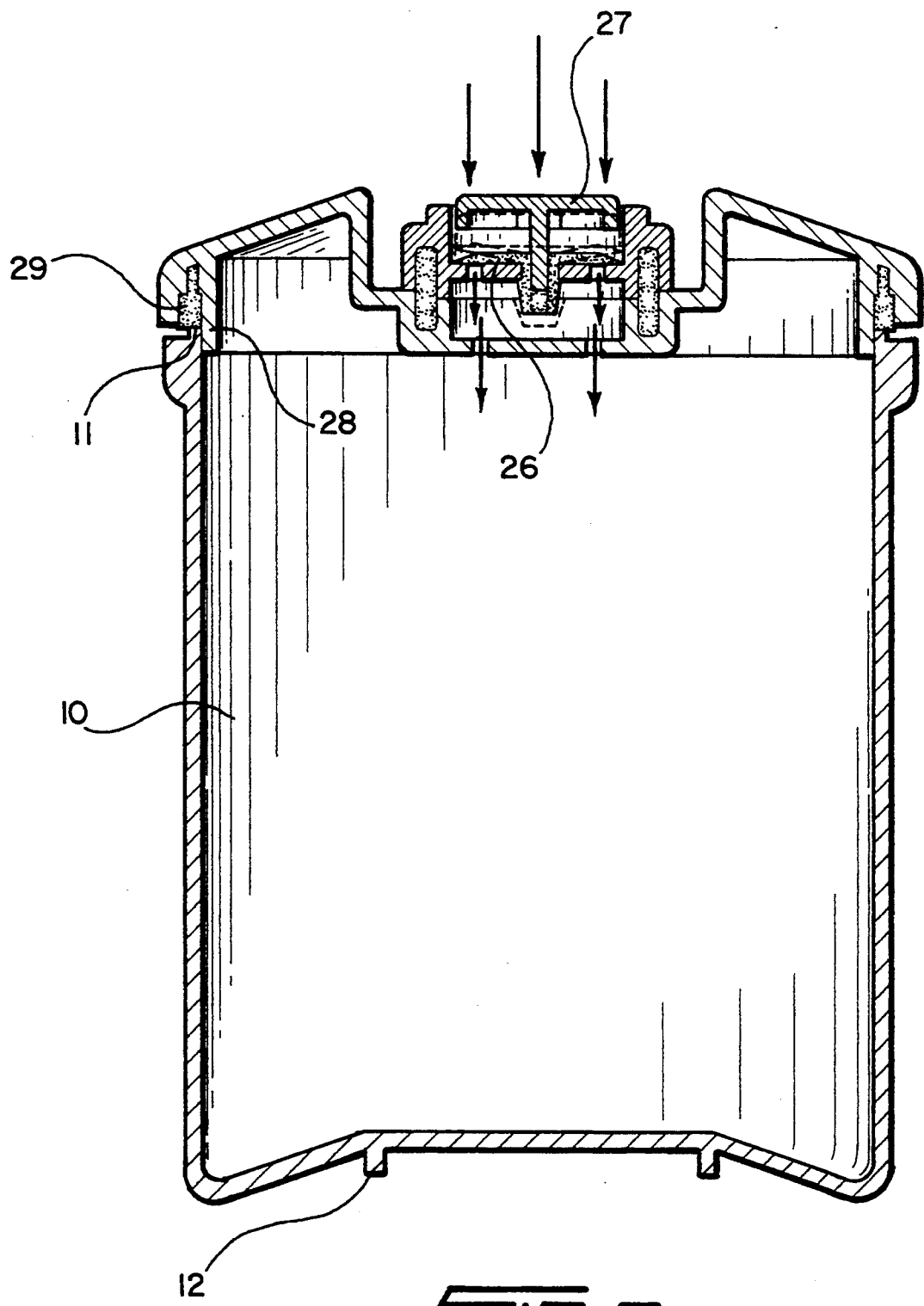
FIG. 6: Cross-Sectional View of Functional Features of Lid

FIG. 6 is a cross sectional view of the functional features of the lid. After the air in the storage container (10) has been removed, the close fit between the elevated lip on the storage container (11), the corresponding concave ring in the lid (29), and the insulating wall (28) prevents air from entering the storage container. To release pressure from the container and open tile lid, one need only press down on the T-shaped button (27), which forces the center of the silicon piece (26) down and its edges up, thereby creating an opening around the fringe of the silicon piece through which air may enter the twin-layered valve, and subsequently the storage container.

The above embodiment of this invention is submitted for illustrative purposes. This invention is not limited to the above embodiment, but rather is intended to cover all alternatives, modifications, and equivalents as may be included in the spirit and scope of the invention.

I claim:

1. A vacuum food container having a storage container with a concave bottom and an upper rim, a lid removably attachable to the storage container and a pump removably attachable to the lid, comprising:
   a) a protruding ring provided on the concave bottom of the storage container to facilitate the stacking of closed food containers upon one another;
   b) an elevated lip provided on the upper rim of the storage container;
   c) a cavity defined by the lid wherein the lid defines at least one first hole in the cavity located so as to communicate with the storage container when the lid is attached thereto;
   d) a protruding ring-shaped insulating wall attached to the lid and configured to contact the elevated lip of the storage container so as to provide an air-tight seal when the lid is attached to the storage container;
   e) a valve assembly attached to the lid in the cavity and comprising:
      i) a drum defining at least one second hole communicating with the at least one first hole;
      ii) a movable valve piece located on the drum so as to normally cover the at least one second hole; and
      iii) a button connected to the movable valve piece such that pressure exerted on the button causes movement of the valve piece so as to uncover the at least one second hole; and
   f) means to removably attach the pump to the lid such that, when a vacuum is drawn in the pump, the valve piece moves so as to uncover the at least one second hole, thereby enabling a vacuum to be drawn in the storage container.

2. The vacuum food container of claim 1 wherein the movable valve piece comprises a silicon material.

3. The vacuum food container of claim 1 wherein the button has a substantially T-shaped cross-sectional configuration.

4. The vacuum food container of claim 2 further comprising a ring-shaped stopper to seal the junction between the drum and the lid.

* * * * *